(12) United States Patent
Duan et al.

(10) Patent No.: US 9,412,532 B2
(45) Date of Patent: Aug. 9, 2016

(54) PORTABLE POWER SOURCE

(71) Applicants: SHENZHEN FUTAIHONG PRECISION INDUSTRY CO., LTD., Shenzhen (CN); FIH (Hong Kong) Limited, Kowloon (HK)

(72) Inventors: Chao Duan, Shenzhen (CN); Shing-Hua Chiang, New Taipei (TW)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 232 days.

(21) Appl. No.: 14/193,211

(22) Filed: Feb. 28, 2014

(65) Prior Publication Data

US 2015/0062784 A1 Mar. 5, 2015

(30) Foreign Application Priority Data

Aug. 29, 2013 (CN) .......................... 2013 1 03838124

(51) Int. Cl.
*H01H 13/14* (2006.01)
*G06F 1/26* (2006.01)
*H01M 10/00* (2006.01)
*H01H 13/02* (2006.01)

(52) U.S. Cl.
CPC ................ *H01H 13/14* (2013.01); *G06F 1/26* (2013.01); *H01M 10/00* (2013.01); *H01H 13/023* (2013.01)

(58) Field of Classification Search
CPC ....... H01H 13/14; H01H 13/02; H01H 13/50; H01H 13/52; H01H 13/66; H01H 13/023; G06F 1/26; H01M 10/00; H02J 7/0042; H02J 7/0003

USPC .......... 361/622; 200/341, 344, 345, 520, 532, 200/245, 283, 314
See application file for complete search history.

(56) References Cited

U.S. PATENT DOCUMENTS

| | | | | |
|---|---|---|---|---|
| 7,348,511 B2* | 3/2008 | Chen | ...................... | H01H 21/24 200/296 |
| 8,493,742 B2* | 7/2013 | Li | .......................... | G06F 1/1601 200/341 |
| 8,537,544 B2* | 9/2013 | Li | .......................... | H04M 1/23 248/176.3 |
| 8,598,479 B2* | 12/2013 | Quan | ..................... | H01H 13/14 200/293 |
| 8,748,766 B2* | 6/2014 | Han | ....................... | H01H 13/06 200/302.1 |
| 2014/0054142 A1* | 2/2014 | Hsiu | ...................... | H01H 25/00 200/16 R |
| 2015/0155726 A1* | 6/2015 | Duan | .................... | H02J 7/0042 320/113 |

FOREIGN PATENT DOCUMENTS

CN 102136382 A 7/2011

* cited by examiner

*Primary Examiner* — Zachary M Pape
(74) *Attorney, Agent, or Firm* — ScienBiziP, P.C.

(57) ABSTRACT

A portable power source includes a main body and a power button. The main body includes a receiving portion. The receiving portion defines a receiving groove and includes a protrusion received in the receiving groove. The protrusion includes a contact switch. The power button includes a button body and a latching arm. The button body pushes the contact switch to turn on/off the portable power source, and the latching arm rebounds the button body away from the contact switch.

11 Claims, 8 Drawing Sheets

PORTABLE POWER SOURCE

BACKGROUND

1. Technical Field

The present disclosure generally relates to portable power sources, and particularly to a portable power source for providing power to an electronic device.

2. Description of Related Art

Portable power sources are often used to charge portable electronic devices such as mobile phones. However, power buttons of the portable power sources may be small, awkwardly positioned, complicated and inconvenient to operate.

Therefore, there is a room for improvement within the art.

BRIEF DESCRIPTION OF THE DRAWINGS

Many aspects of the portable power source can be better understood with reference to the following drawings. The components in the drawings are not necessarily to scale, the emphasis instead being placed upon clearly illustrating the portable power source. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
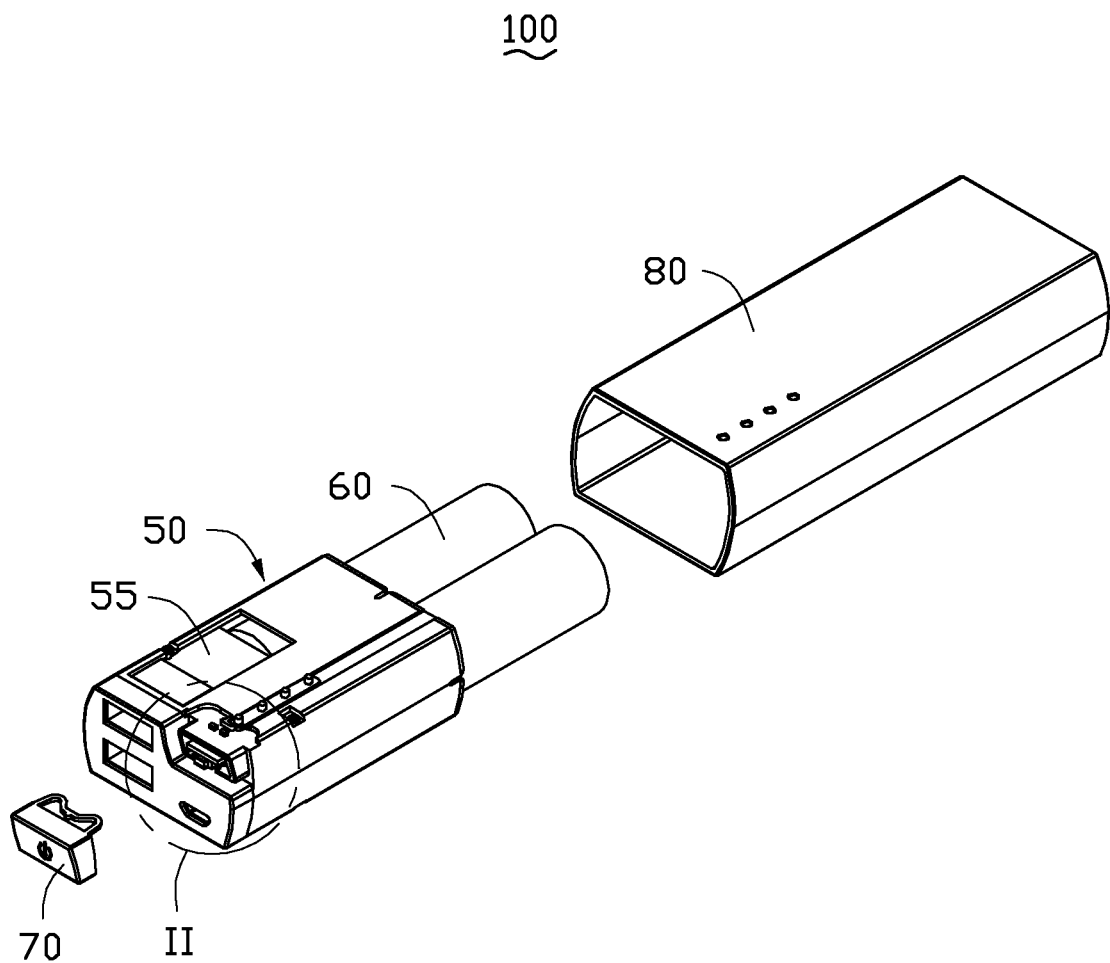
FIG. 1 is an exploded, schematic view of an embodiment of a portable power source.

FIG. 1 shows an exemplary embodiment of a portable power source 100. The portable power source 100 includes a main body 50, a printed circuit board 55, an electric core 60, a power button 70, and a housing 80. The electric core 60 is received in the main body 50, and one end portion of the electric core 60 extends out of the main body 50. The electric core 60 is electronically connected to the printed circuit board 55 for receiving and storing power. The main body 50 and the electric core 60 are received in the housing 80. The power button 70 is located at one end portion of the main body 50 opposite from the electric core 60, and exposed from the housing 80.

Figure 2:
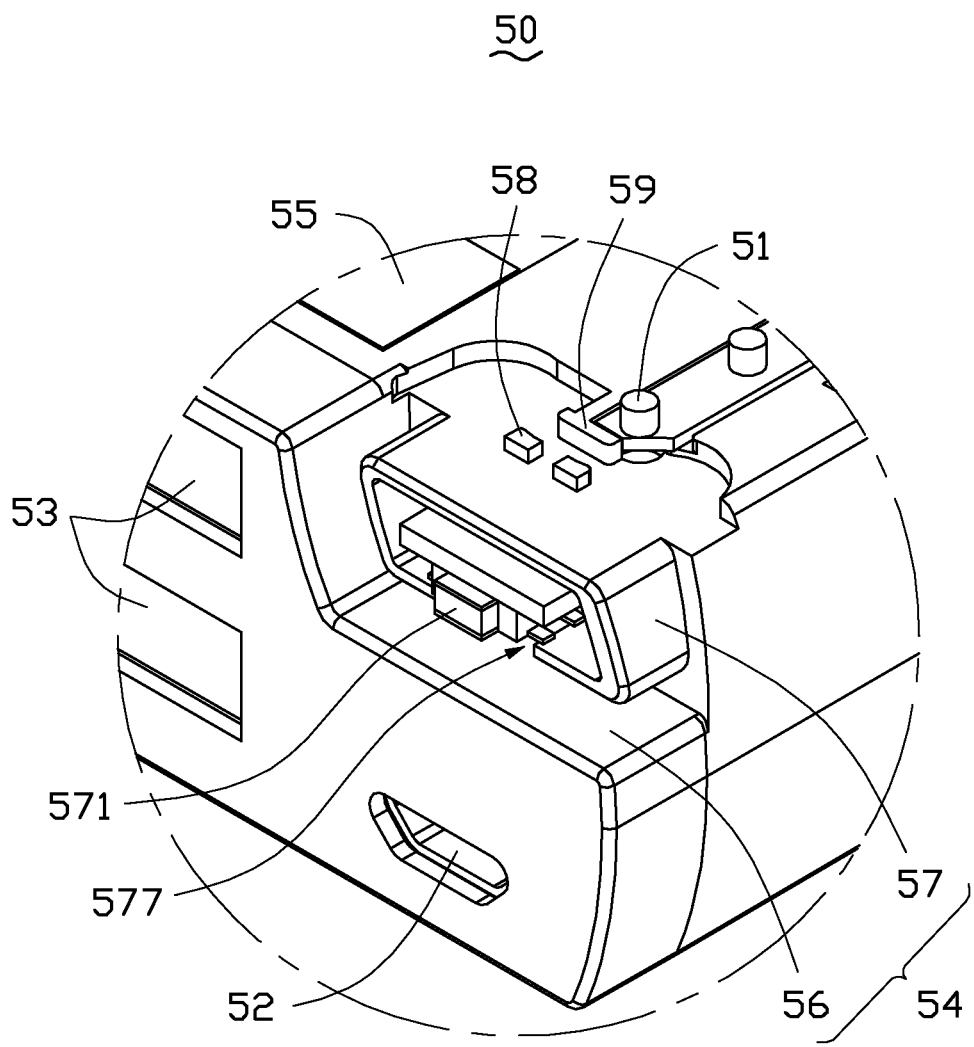
FIG. 2 is an enlarged view of a circled portion II of FIG. 1.

FIGS. 1 and 2 show that the main body 50 includes a plurality of (e.g. four) indicator lights 51, an input port 52, one or more output ports 53, and a receiving portion 54. The indicator lights 51 are arranged adjacent to the first end portion of the main body 50 and electronically connected to the printed circuit board 55. When the portable power source 100 is being charged or charges an electronic device, the indicator lights 51 light up to indicate a current amount of power of the portable power source 100. The input port 52 and the output ports 53 are electronically connected to the printed circuit board 55. The input port 52 is used to connect to a power source (not shown) to charge the portable power source 100. The output ports 53 are used to provide power to and charge electronic devices. In one exemplary embodiment, there are two output port 53 and each port 53 supplies a different output current. For example, the output current of a first output port 53 is 1 ampere (A), and the output current of a second output port 53 is 2 A. Thus, different electronic devices requiring different output currents can be charged.

Figure 3:
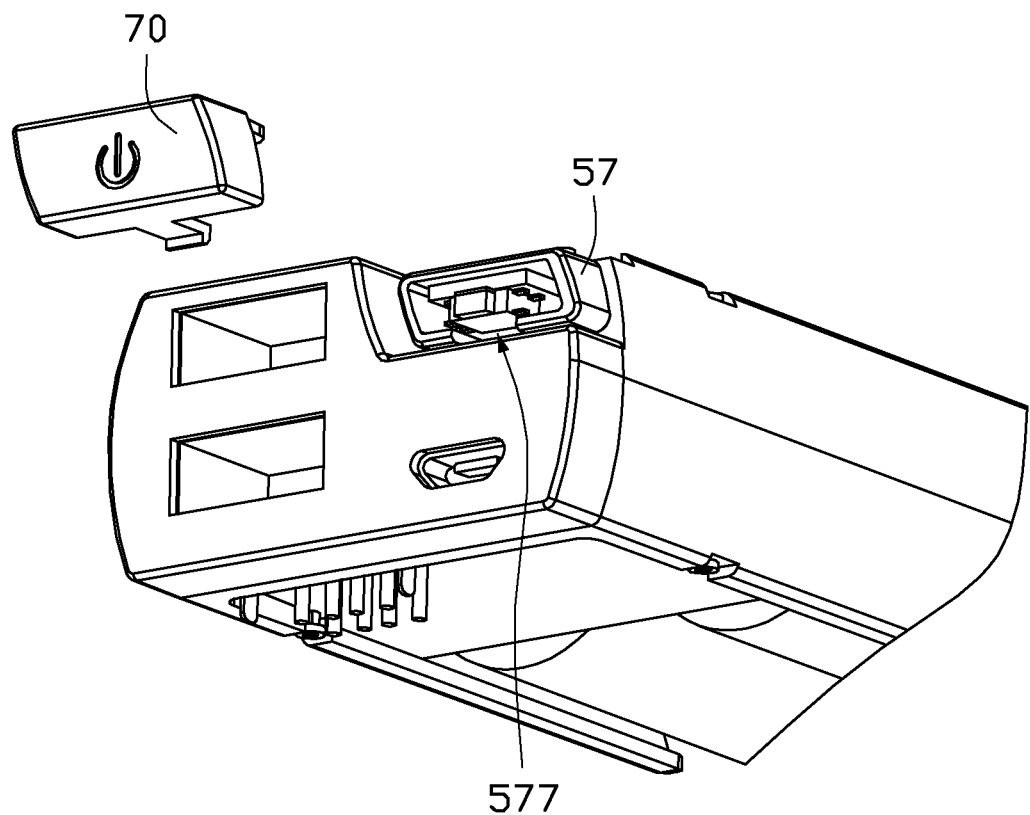
FIG. 3 is similar to FIG. 1, but shows a cutaway view from another aspect.

The receiving portion 54 is located on the first end portion of the main body 50. In the illustrated embodiment, the receiving portion 54 defines a receiving groove 56 and a protrusion 57 received in the receiving groove 56. The protrusion 57 is substantially a hollow frame and receives a contact switch 571. The contact switch 571 is electronically connected to the printed circuit board 55. When the contact switch 571 is pressed, the contact switch 571 controls the portable power source 100 to output current. Referring to FIGS. 2 and 3, a top surface of the protrusion 57 forms latching blocks 58 and a stopper 59, and a bottom surface of the protrusion 57 defines a cutout 577.

Figure 4:
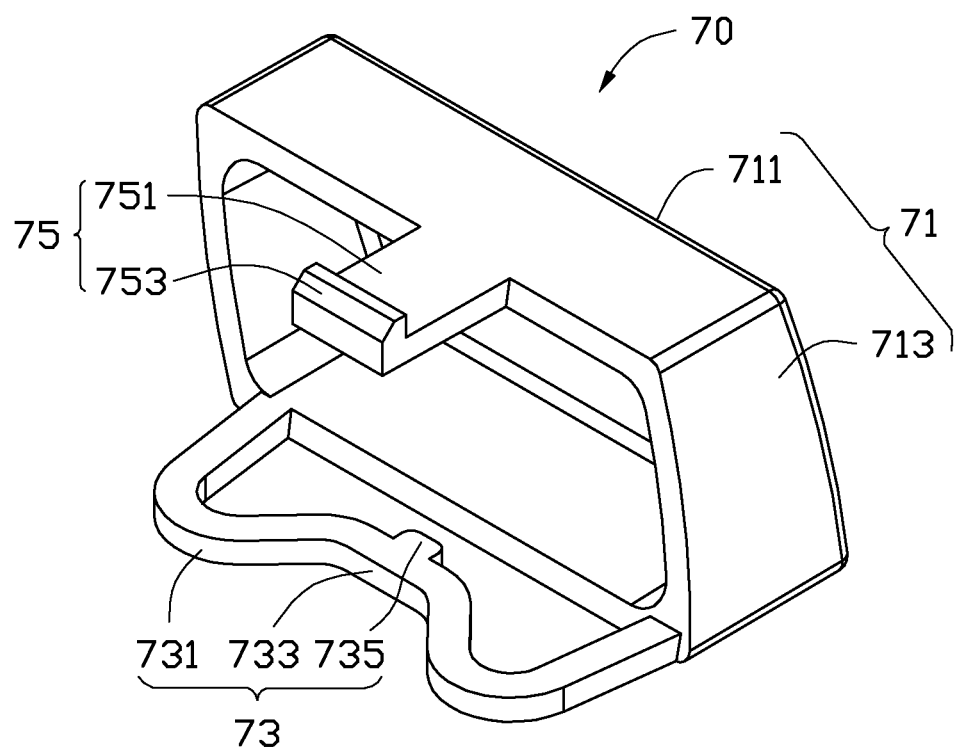
FIG. 4 is an enlarged view of a power button of the portable power source of FIG. 1, but shown from another aspect.

FIG. 4 shows an isometric view of the power button 70. The power button 70 is assembled to the receiving portion 54 for turning on/off the portable power source 100. The power button 70 includes a button body 71, a latching arm 73, and a hook 75. The button body 71 is cooperatively formed by an end wall 711 and sidewalls 713 connected to the end wall 711. The latching arm 73 protrudes from a first side wall 713 for rebounding the power button 70 from the receiving portion 54. The latching arm 73 includes two arched portions 731 and a necked portion 733 connected between the arched portions 731. A projection 735 extends from the necked portion 733. The projection 735 is slidably received between the latching blocks 58 to stably connect the power button 70 to the receiving portion 54. The hook 75 protrudes from a second side wall 713 opposite to the first sidewall 713. The hook 75 includes an extending portion 751 and a hooked portion 753 formed at one end of the extending portion 751. The extending portion 751 is received in the cutout 577, and the hooked portion 753 is latched with the main body 50.

Figure 7:
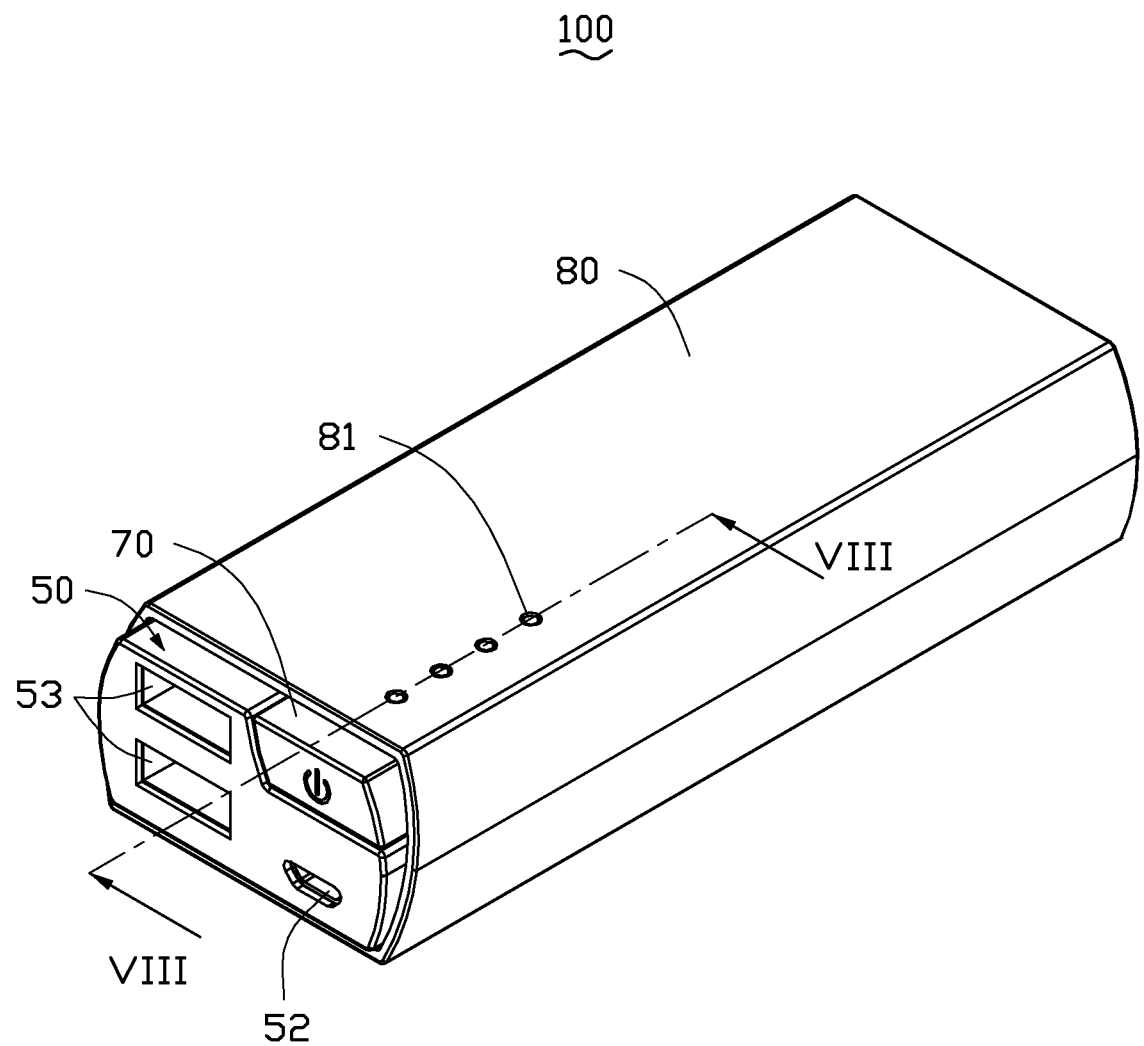
FIG. 7 is an assembled view of the portable power source of FIG. 1.

Referring to FIG. 7, the housing 80 defines a plurality of through holes 81. When the main body 50 is received in the housing 80, the indicator lights 51 are exposed through the through holes 81.

Figure 5:
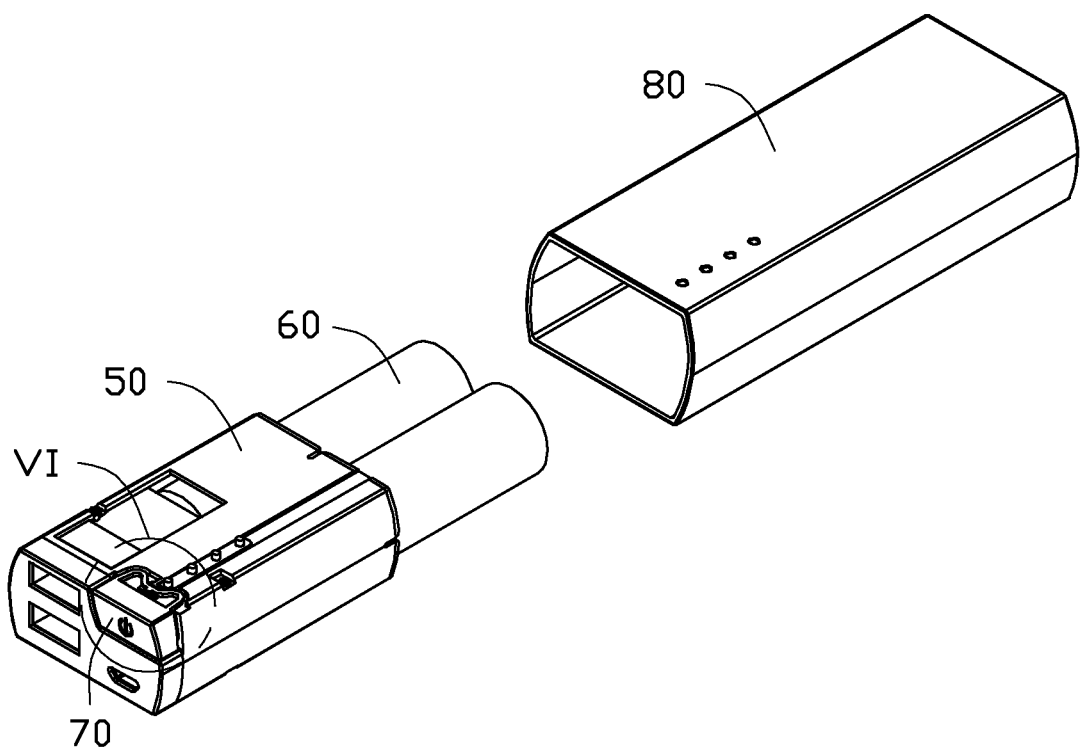
FIG. 5 is a partially assembled view of FIG. 1
Figure 6:
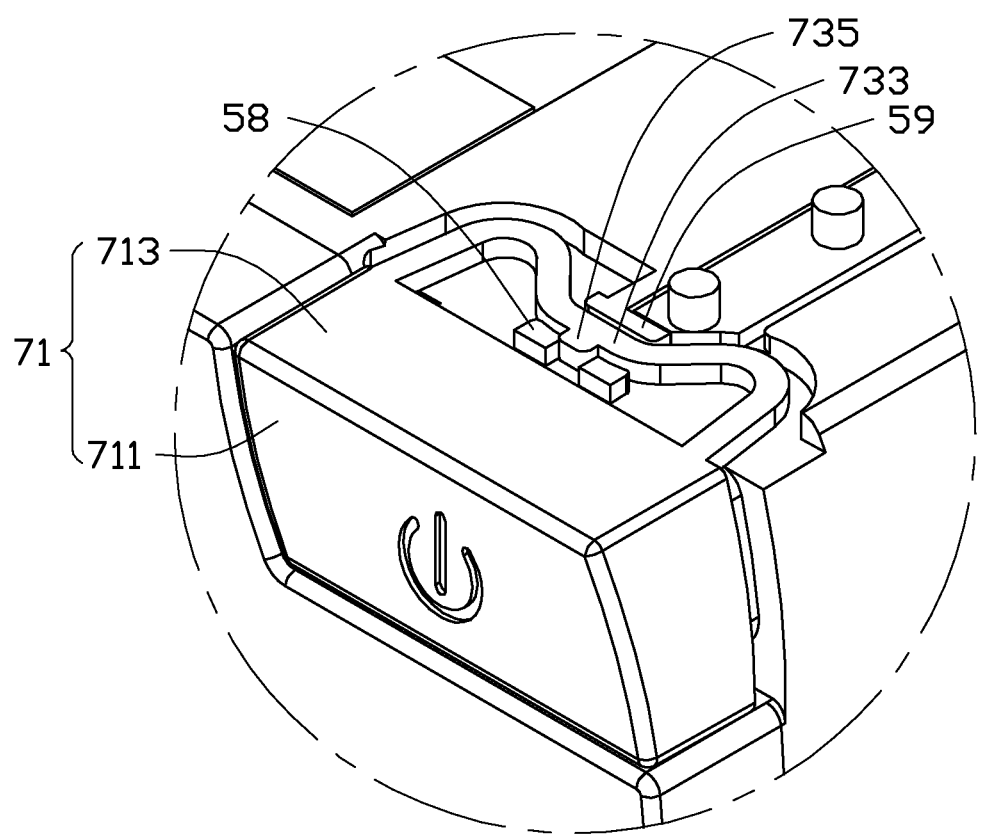
FIG. 6 is an enlarged view of a circled portion VI of FIG. 5.
Figure 8:
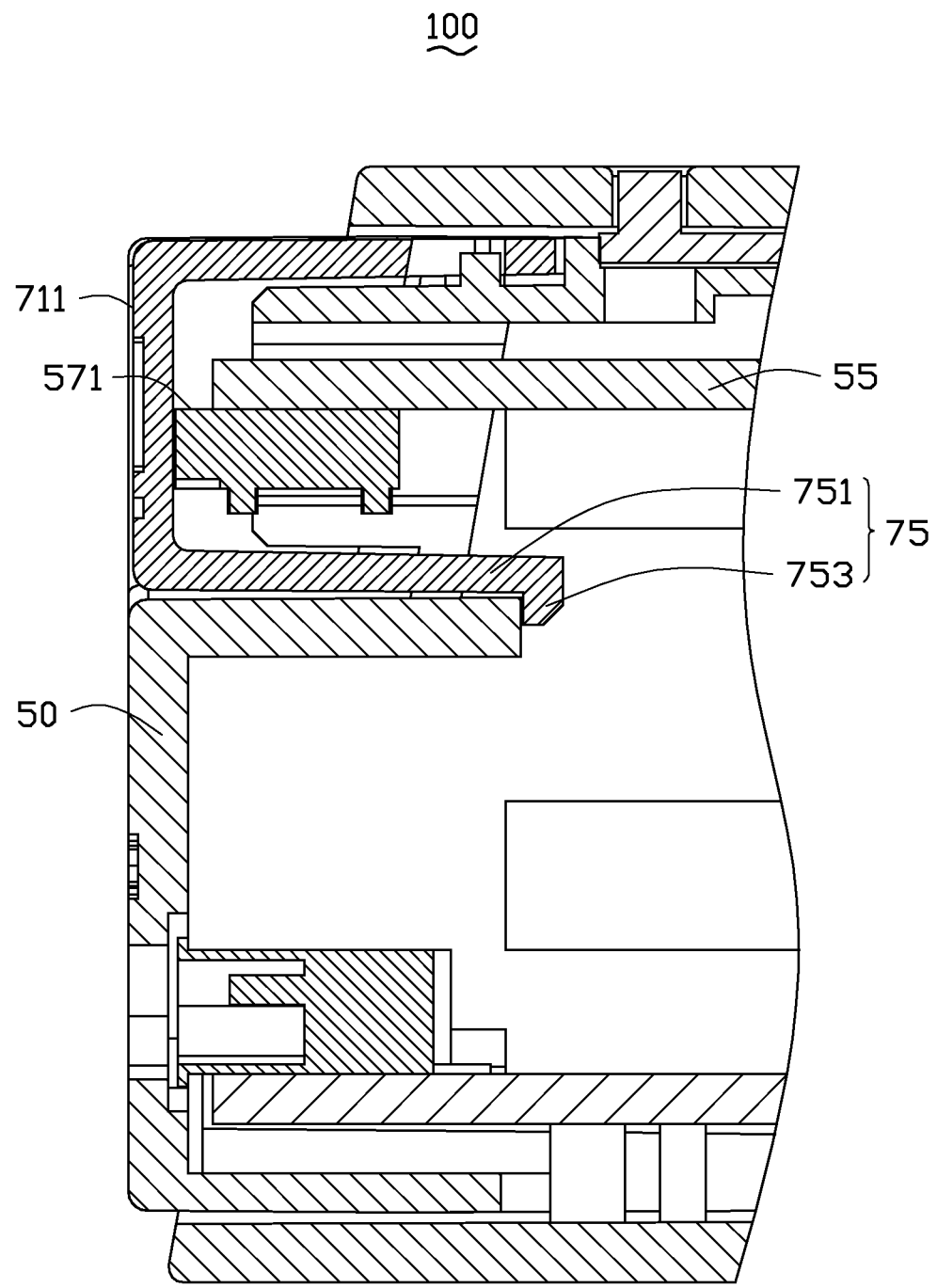
FIG. 8 is a cross-sectional view taken along line VIII-VIII of FIG. 7.

In assembly, referring to FIGS. 5, 6, and 8, when the power button 70 is assembled to the receiving portion 54, the side walls 713 of the power button 70 surround the protrusion 57 of the receiving portion 54, and the end wall 711 faces the contact switch 571. The projection 735 is received between the latching blocks 58, the extending portion 751 is received in the cutout 577, and the hooked portion 753 is latched with the main body 50. Lastly, the main body 50 is received in the housing 80, such that the power button 70 is exposed from the housing 80.

In use, when the power button 70 is pressed by an external force, the projection 735 slides between the latching blocks 58, until the necked portion 733 resists against the stopper 59. As the necked portion resists against the stopper 59, the arched portions 73 deform, and the button body 71 presses the contact switch 571 to turn on the electric core 60. Accordingly, the portable power source 100 outputs current, and the indicator lights 51 light up to indicate a current amount of power of the portable power source 100. When the external force is removed, the arched portions 73 rebound the power button 70 away from the contact switch 571. To turn off the electric core 60, the button 70 is pushed again. Because the power button 70 is more stably secured on the main body 50, it easily rebounds, and the operation of the portable power source 100 is simplified.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable power source comprising:
    a main body including a receiving portion, the receiving portion including a receiving groove and a protrusion received in the receiving groove, the protrusion having a contact switch;
    a power button including a button body and a latching arm, the button body controlling the contact switch to turn on or off the portable power source, the latching arm for rebounding the button body to an original position;
    a housing; and
    an electric core;
    wherein the electric core is positioned in the main body, and one end of the electric core extends out of the main body, and the main body and the electric core are together received in the housing.

2. The portable power source as claimed in claim 1, wherein the button body has an end wall and side walls connected to edges of the end wall, the side walls surrounding the hollow frame, and the end wall faces the contact switch.

3. The portable power source as claimed in claim 1, wherein one side of the protrusion has latching blocks and a stopper, the latching arm includes two arched portions and a necked portion connected between the arched portions, a projection extends from the necked portion, the projection is slidably received between the latching blocks, and is stopped by the stopper.

4. The portable power source as claimed in claim 3, wherein another side of the protrusion defines a cutout, the power button has a hook opposite to the latching arm, the hook has an extending portion and a hooked portion formed at one end of the extending portion, the extending portion is received in the cutout, and the hooked portion is latched with the main body.

5. The portable power source as claimed in claim 1, wherein the main body includes a printed circuit board, indicator lights, an input port, and output ports, and the indicator lights, the input port, and the output ports are electronically connected to the printed circuit board.

6. A portable power source comprising:
    a main body including a receiving groove and a protrusion received in the receiving groove, the protrusion having a contact switch; and
    a power button including a button body, a latching arm, and a hook, the hook being opposite to the latching arm, the button body controlling the contact switch to turn on or off the portable power source, the latching arm rebounding the button body to an original position, and the hook is latched with the main body.

7. The portable power source as claimed in claim 6, wherein the button body has an end wall and side walls connected to edges of the end wall, the side walls surround the hollow frame, and the end wall faces the contact switch.

8. The portable power source as claimed in claim 6, wherein one side of the protrusion has two latching blocks and a stopper, the latching arm includes two arched portions and a necked portion connected between the arched portions, a projection extends from the necked portion, the projection is slidably received between the latching blocks, and is stopped by the stopper.

9. The portable power source as claimed in claim 8, wherein another side of the protrusion defines a cutout, the hook has an extending portion and a hooked portion formed at one end of the extending portion, the extending portion is received in the cutout, and the hooked portion is latched with the main body.

10. The portable power source as claimed in claim 6, wherein the main body includes a printed circuit board, indicator lights, an input port, and output ports, and the indicator lights, the input port, and the output ports are electronically connected to the printed circuit board.

11. The portable power source as claimed in claim 6, further comprising a housing and an electric core, wherein the electric core is positioned in the main body, and one end of the electric core extends out of the main body, and the main body and the electric core are together received in the housing.

* * * * *